United States Patent Office 3,413,725
Patented Dec. 3, 1968

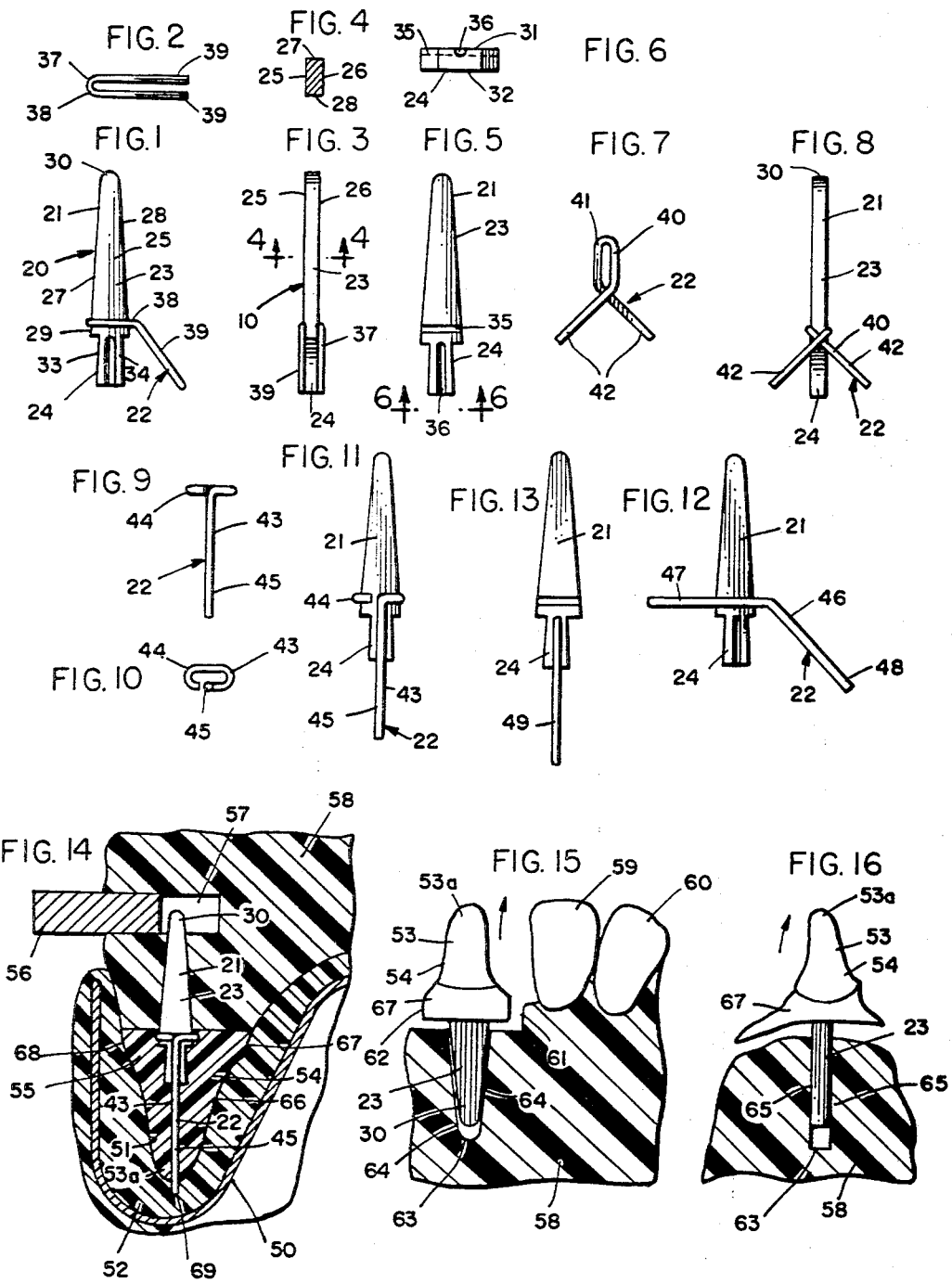

3,413,725
DOWEL ASSEMBLY WITH REMOVABLE POSITIONING MEANS
Alfred J. Stern, 5307 Valkeith St. 77035, and Harold L. Stern, 6906 Van Etten St. 77021, both of Houston, Tex.
Continuation-in-part of applications Ser. No. 579,748, Sept. 15, 1966, and Ser. No. 595,557, Oct. 27, 1966. This application July 28, 1967, Ser. No. 656,921
11 Claims. (Cl. 32—40)

ABSTRACT OF THE DISCLOSURE

A dowel assembly for use in making a positive model of a tooth comprising an elongated dowel and a positioning pin removably secured to the dowel. The dowel includes a shank portion and a tapered seating portion having a pair of flat parallel surfaces, one of which is provided with a transverse groove. A portion of the positioning pin extends generally perimetrically about the seating portion and clampingly engages the dowel, and the positioning pin is restrained against longitudinal movement by the transverse groove. The remainder of the positioning pin extends outwardly from the seating portion either longitudinally along the shank portion or at an angle with respect to the longitudinal axis of the dowel.

Related applications

This application is a continuation-in-part of our prior copending applications entitled Dowel Assembly, Ser. No. 579,748, filed Sept. 15, 1966, and Dowel Positioning Means, Ser. No. 595,557 filed Oct. 27, 1966 now U.S. Patent No. 3,330,557.

Background of the invention

This invention relates to a dowel assembly for preparing models of teeth for use in making bridges and abutments for partials or any other purpose for which a removable or reinforced abutment is desirable.

It is common practice when making a model of a patient's teeth to first form a negative impression of the teeth. Dowels are positioned in the center of impressions of particular teeth which are to be worked on, and the negative impressions of the teeth are then filled with a die material to form a positive replica or model of the teeth. Dowels may also be positioned in the impressions adjacent the impressions of the teeth which are to be worked on in order to reinforce adjacent teeth. After the die material has cured or set, the model is completed by casting a base stone formed integrally with the die material to form a foundation for the teeth.

The dowel must be carefully positioned in the center of the negative impression or troublesome complications can arise. For example, if the dowels are inserted at too great an angle with respect to the tooth that is to be formed, the die may be difficult to remove from the base stone or may be damaged in doing so. If the dowels are inserted too far into the negative impressions, the thin layer of die stone may literally flake off after it is separated from the base stone. If the dowels are not inserted far enough into the impressions, the die material will not be sufficiently secured to the dowel and may break off.

In order to insure accuracy in forming the positive models of the teeth, the dowels should be pre-positioned before the die is poured. The positioning means must be strong enough to resist breaking while the teeth models are being prepared and should be adaptable to be used with a variety of sizes of impressions.

After the positive model of the teeth is formed, models of individual teeth are removed from the base stone to be worked on by the dentist or technician. The models may be removed and replaced several times, and each model should reseat accurately each time it is replaced. If the models do not fit precisely, the bridge will be different and the dentist may encounter difficulty in attempting to fit the patient.

Summary of the invention

The dowel assembly of the present invention is provided with removable positioning means. The positioning means clampingly engage the dowel and are restrained against longitudinal movement by a transverse groove provided in the dowel. The positioning means can be positioned on the dowel after the negative impression is formed, and a variety of positioning means may be provided so that a particular positioning means which best fits the particular negative impression may be used.

The dowel is further provided with a pair of flat parallel surfaces. When the dowel is to be replaced in the base stone, the mating of the parallel surfaces of the dowel with the corresponding parallel surfaces of the base stone insure a precise fit. If grains of wax or plaster used in making the model have fallen into the opening in the base stone, the precise fit of the dowel exaggerates the interference and calls attention to the interfering particles.

Description of the drawing

FIG. 1 is a side elevational view of a dowel and one embodiment of the positioning means;

FIG. 2 is a top plan view of the positioning means of FIG. 1;

FIG. 3 is a side elevational view of the dowel and positioning means of FIG. 1;

FIG. 4 is a sectional view taken along the lines 4—4 of FIG. 3;

FIG. 5 is a front elevational view of the dowel of FIG. 1 with the positioning means removed;

FIG. 6 is a view of the dowel taken along the line 6—6 of FIG. 5;

FIG. 7 is a top plan view of another embodiment of the positioning means;

FIG. 8 is a side elevational view of a dowel with the positioning means of FIG. 7;

FIG. 9 is a front elevational view of another embodiment of the positioning means;

FIG. 10 is a bottom plan view of the positioning means of FIG. 9;

FIG. 11 is a front elevational view of a dowel with the positioning means of FIG. 9;

FIG. 12 is a front elevational view of a dowel with another embodiment of the positioning means;

FIG. 13 is a front elevational view of a dowel with still another embodiment of the positioning means;

FIG. 14 is a fragmentary sectional view illustrating the use of a dowel in forming a positive model of a tooth;

FIG. 15 is a fragmentary sectional view showing a model tooth being removed from the model bridge;

FIG. 16 is a view similar to FIG. 14 taken at right angles thereto.

Description of the preferred embodiment

Referring to FIGS. 1–6, the numeral 20 designates generally a dowel assembly for use in making a removable or reinforced abutment or bridge. The dowel assembly 20 includes an elongated dowel 21 and positioning means 22. Dowel 21 includes an elongated tapered seating portion 23 and a shank portion 24. Seating portion 23 includes a pair of flat generally parallel surfaces 25 and 26, and a pair of angularly inclined side surfaces 27 and 28. In the particular embodiment illustrated, inclined surfaces 27 and 28 are flat to provide the seating portion 23 with a generally rectangular transverse cross-section (FIG. 4), but the surfaces 27 and 28 may also be curved. Inclined surfaces 27 and 28 narrow from a wide end 29 adjacent the shank portion to a narrow end 30, which may advantageously be slightly rounded.

Shank portion 24 extends longitudinally from the wide end of the seating portion and includes generally parallel front and back surfaces 31 and 32, respectively, and side surfaces 33 and 34, which may taper slightly outwardly as they extend from the seating portion 23. The spacing between the inclined side surfaces 27 and 28 at the wider end 29 is seen to be greater than the spacing between side surfaces 33 and 34 of the shank portion.

Referring particularly to FIGS. 5 and 6, seating portion 21 is provided with a transverse groove 35 adjacent the wide end 29 thereof, and shank portion 24 is provided with a longitudinal groove 36.

The particular positioning means illustrated in FIGS. 1–3 is a pin 27 folded on itself to form a generally horse shoe-shaped portion 38 and a pair of pin ends 29 which extend angularly from the horse shoe portion 38 and which are adapted to be inserted into the impression material. The horse shoe portion 38 is seen to extend generally perimetrically about three of the four surfaces of the seating portion and part of the horse shoe portion is received by transverse groove 35. The distance between the folded halves of pin 37 is slightly less than the distance between the bottom of transverse groove 35 and rear surface 26 of the seating portion and the pin 37 is made of sufficiently resilient material to allow the dowel 21 to be inserted between the folded halves of the pin and be clampingly engaged therebetween. A second transverse groove may be provided if desired in the rear surface 26 of the shank portion.

Referring to FIGS. 7 and 8, another embodiment of the positioning means 22 is illustrated. Pin 40 is bent to provide a loop 41 and pin ends 42 which extend angularly with respect to each other and with respect to the plane of loop 41. Pin 40 may be positioned on the dowel 21 by squeezing pin ends 42 together to enlarge the opening of loop 41 to allow the dowel to be inserted therein. When the loop 41 is positioned adjacent the transverse groove 35, the pin ends 42 may be released to allow the pin 40 to clampingly engage the shank portion of the dowel. Once again, the pin 40 is restrained against longitudinal movement by the transverse groove 35. Pin 40 may be easily removed from the dowel 21 by squeezing pin ends 42 and withdrawing the dowel.

A third embodiment of the positioning means 22 is illustrated in FIGS. 9–11. One end of pin 43 is bent to form a loop 44, and pin end 45 extends generally normal to the plane of loop 44. Pin 43 may be attached to dowel 21 by inserting the narrow end 30 of the dowel into the opening of the loop 44 and pulling the pin downwardly toward the wide end 29 until the loop is received by the transverse groove 35. In this position the loop 44 extends perimetrically about the seating portion 23, and, since the normal opening of the loop 44 is smaller than the cross sectional area of the shank portion at this point, the pin 43 clampingly engages the seating portion. Pin end 45 extends longitudinally over shank portion 24 and is received by longitudinal groove 36 of the shank portion. In the particular embodiment illustrated, longitudinal groove 36 terminates below transverse groove 35, but it is to be understood that the two grooves may also communicate.

Still another embodiment of the positioning means 22 is illustrated in FIG. 12. Pin 46 having a transverse portion 47 and an angled portion 48 is received by transverse groove 35 and secured therein by soldering or spot welding. The transverse portion is received by the groove 35, and the angle portion extends from the seating portion 23 at an angle with respect to the longitudinal axis thereof.

Referring to FIG. 13, a straight pin 49 is received by longitudinal groove 36 and secured by soldering or spot welding. Pin 49 extends longitudinally from the shank portion away from the seating portion. If desired dowel 21 may be given greater versatility by providing it with both pin 46 and pin 49. The positioning means that is not to be used may be clipped off with wire cutters or the like before the dowel is positioned in the negative impressions.

Referring to FIG. 14, a dental tray 50 is shown in which negative impressions 51 of a patient's teeth and the associated gum areas are formed. The negative impressions 51 are formed in a suitable elastomeric impression material 52, which can be any of several commercially available elastomeric materials which are commonly formed of silicone base rubber, mercaptan base rubber, or hydrocolloid.

After the impression material 52 is placed in the dental tray, the dowel 21 is positioned generally in the center of the negative impression of the tooth that is to be worked on by the positioning means 22. FIG. 14 illustrates the use of positioning pin 43. Pin end 45 is inserted into the impression material 52 at the bottom of the negative impression 51 which corresponds to incisal area 53a (FIGS. 15 and 16) of crown portion 53 of a tooth 54. The seating portion 23 of the dowel 21 is positioned upwardly of the bottom of the negative impression.

After the dowels 21 are properly positioned in the negative impressions, impressions are filled with die material 55, which may advantageously be a calcium sulfate hemihydrate compound such as "Bingle Die." The die material 55 is filled to a level above the transverse groove 35 of the dowel, and once the die material sets the dowel is firmly positioned within the die material by virtue of the tapered surfaces 27, 28, 33 and 34 of the dowel and by the perimetrically extending portion of the positioning means.

If desired, channel forming members 56 may then be positioned over the narrow end 30 of the dowel. The channel forming members 56 are used to provide access to the dowel after the base stone is poured to facilitate removal of the dowel and the positive model from the base stone. The elongated channel formers are generally rectangular in transverse section and are provided with a slit 57 at one end thereof which receives the narrow end 30 of the dowel. The channel formers may readily be inserted over the dowel by virtue of the flattened cross section thereof, and the flat sides of the dowel help maintain the channel formers in the proper position. A more detailed description of the channel formers 56 may be found in my co-pending application entitled Dowel Assembly, Ser. No. 579,748 filed Sept. 15, 1966.

After the channel formers 56 are positioned, a base stone 58 is cast over the die material 55. The base stone 58 is formed of plaster of Paris, or any other suitable material, and provides a mounting means for the positive model of the patient's teeth. The base stone may be securely attached to the die material by inserting wire loops, eye hooks, or the like into the die material before the base stone is poured.

After the base stone 58 sets, the channel formers 56 may be removed. The positive model 54 of the tooth that is worked on is separated from the positive models 59 and 60 of other teeth by saw cuts 61 and 62 (FIG. 15). The positive model 54 may then be removed from the base stone, and this removal is facilitated by the opening provided by the channel former 56 which permits the narrow end 30 of the dowel to be pushed upwardly.

The casting of the base stone 58 around the seating portion 23 of the dowel provides a keyway 63 having the same configuration as the outer surface of the seating portion, that is, the keyway 63 has a pair of inclined sides 64 corresponding to the inclined sides 27 and 28 of the seating portion, and a pair of generally parallel flat sides 65 (FIG. 16) corresponding to the flat generally parallel sides 25 and 26 of the seating portion.

The tooth 54 may then be removed and worked. However, when the tooth is to be replaced in the base stone, it should reseat in keyway 63 accurately in order to insure that the resultant crown or bridgework is accurate. If the seating portion 23 of the dowel does not fit precisely into the keyway, the bridge will be different, and the dentist will encounter difficulty in attempting to position properly the bridge in the patient's mouth. The configuration of dowel 21 insures that it will reseat properly in keyway 63 each time the tooth is replaced. The seating portion 23 cannot be inserted into the keyway 63 unless the parallel side 25 and 26 and the inclined sides 27 and 28 of the seating portion are aligned with corresponding parallel sides 65 and inclined sides 64, respectively, of the keyway. When these surfaces correspond, the seating portion easily slides into the keyway, and the configuration of the various sides prevents rotation of the dowel within the keyway. Since only two of the seating portion surfaces are parallel and the other two are tapered, a slight to and fro movement of the seating portion in the direction parallel to the parallel surfaces is permitted while the seating portion is being inserted into the keyway in order to facilitate this insertion. However, the parallel surfaces prevent any rotary or twisting movement.

It frequently happens that while a tooth is removed from the base stone to be worked on, grains of plaster, wax, or other foreign matter may fall into the keyway 63. Since the relatively precise fit of the seating portion of the keyway permits very little interference between the surfaces of the seating portion and the surfaces of the keyway, the presence of foreign matter is readily noticed. If the tooth were replaced in the base stone without removing the foreign matter, it would not be repositioned properly, thereby causing inaccuracies in the bridge.

The positioning of the dowel within the negative impression 51 was previously described using the positioning means of FIGS. 9–11. If the positioning means illustrated in FIGS. 1–3 is used, the pin ends 39 are inserted into the buccal or rear surface 66 of the impression material in the non-vital gum area 67 away from the tooth or crown area 53. Alternatively, the pin ends 39 may be inserted into the labial or front surface 68 of the impression material in the gum area 67.

Similarly, if the positioning means of FIGS. 7 and 8 is used, the pin ends 42 may be inserted into either the labial or buccal surface of the negative impression in the gum area. Once again the positioning means position the dowel centrally in the negative impression 51 so that the dowel extends generally along the longitudinal axis of the tooth and is spaced from the side walls of the tooth.

The positioning means illustrated in FIG. 12 may position the dowel by inserting transverse portion 47 of pin 46 into the labial surface of the impression material and the angled portion 48 into the buccal surface 66. Alternatively, the transverse portion and the angled portion can be inserted into the buccal and labial surfaces, respectively.

The positioning means of FIG. 13 is employed in a manner similar to the positioning means of FIGS. 9–11.

Since the positioning means 22 is inserted into the impression material before the die material 55 is poured, the resultant positive model of the tooth will have a portion of the pin end of the positioning means protruding therefrom. For example, as illustrated in FIG. 14, pin end 45 protrudes from tooth 54 as at 69. The projecting portion of the positioning means may be clipped off or ground down with a separating disc and then polished with an abrasive rubber wheel.

If the positioning means illustrated in FIGS. 9–11 is used, the protruding portion of the pin end extends through the incisal area 53a of the crown portion of the tooth. If the positioning means illustrated in FIGS. 1–3 and FIGS. 7–8 are used, the protruding portions of the pin ends will extend through the gum area 67 of the tooth. In all cases, the pin ends will not protrude through the area of the crown portion that is to be worked on.

The generally rectangular cross-section of the seating portion 23 (FIG. 4) provided by the relatively narrow walls 27 and 28 and the relatively wide walls 26 and 25 permit the dowels to be positioned relatively close together in the negative impressions without any sacrifice in wall strength between the keyways 63. Thus, the same dowels can be used for both large and small teeth, and dowels can be used to strengthen teeth which are not to be removed but are adjacent to teeth that will be removed. Further, most tooth roots are thinner mesial to distal, or side to side (FIG. 15), than from labial to lingual, or front to rear (FIG. 16). Thus, the dowels 21 more closely simulate nature. In one embodiment of the invention the distance between the parallel surfaces 25 and 26 was 0.060 inch.

Although the dowel has been described as having a pair of parallel surfaces and a pair of flat inclined surfaces, the dowel may be provided with more than two parallel surfaces and more than two flat inclined surfaces. The dowel may also be provided with serrations or threads on the shank portion to provide a more secure attachment of the dowel to the die material.

While in the foregoing specification, detailed descriptions of specific embodiments of our invention was set forth for the purpose of illustration, it is to be understood that many of the details herein given may be varied considerably by those skilled in the art without departing from the spirit and scope of the invention.

We claim:

1. A dowel assembly for use in making a positive model of a tooth comprising an elongated dowel and a pin removably secured to the dowel, said dowel including a longitudinally extending generally tapered seating portion and a shank portion, said dowel being provided with a groove in the outer surface thereof, said pin being received by said groove and extending outwardly from said dowel.

2. The dowel assembly of claim 1 in which said groove extends transversely along the outer surface of said seating portion, a portion of said pin extending generally perimetrically about said seating portion to clampingly engage said dowel.

3. The dowel assembly of claim 2 in which the remainder of said pin extends from said perimetrically extending portion along said shank portion and longitudinally outwardly from said dowel.

4. The dowel assembly of claim 3 of which said shank portion is provided with a longitudinally extending groove which receives said pin.

5. The dowel assembly of claim 2 in which the remainder of said pin extends from said perimetrically extending portion outwardly from said dowel at an angle with respect to the longitudinal axis of said dowel.

6. The dowel assembly of claim 5 in which said perimetrically extending portion of the pin is provided by a loop in the pin intermediate the ends thereof, said pin ends crossing each other and extending from said dowel at an angle with respect to each other.

7. A dowel assembly for use in making a positive model of a tooth comprising an elongated dowel and a pin removably secured to the dowel, said dowel including a longitudinally extending generally tapered seating portion and a shank portion, said seating portion having a pair of flat generally parallel surfaces and a pair of inclined flat surfaces providing the seating portion with a wide end and a narrow end, one of said generally parallel surfaces being provided with a transversely extending groove, said shank extending longitudinally from said wide end, a portion of said pin extending generally perimetrically about said seating portion to clampingly engage said dowel and being restrained against longitudinal movement by said groove, the remainder of said pin extending from said perimetrically extending portion outwardly from said seating portion.

8. The dowel assembly of claim 7 in which the remainder of said pin extends along said shank portion and longitudinally outwardly from said shank portion.

9. The dowel assembly of claim 8 in which the remainder of said pin extends from said perimetrically extending portion at an angle with the longitudinal axis of the dowel.

10. The dowel assembly of claim 9 in which said perimetrically extending portion of the pin is provided by a loop in the pin intermediate the ends thereof, said pin ends crossing each other and extending from said dowel at an angle with respect to each other.

11. An elongated dowel for use in making a positive model of a tooth from a negative impression of the tooth formed in impression material, said dowel having an elongated seating portion and a shank portion, said seating portion having at least one flat surface and being tapered along its longitudinal length to provide a wide end and narrow end, said shank portion extending from the wide end of said seating portion, the flat surface of the seating portion being provided with a transversely extending groove adapted to receive a pin member for positioning the dowel in the impression material, said shank portion being provided with a longitudinally extending groove adapted to receive a pin member for positioning the dowel in the impression material.

References Cited

UNITED STATES PATENTS

| | | | |
|---|---|---|---|
| 1,224,195 | 5/1917 | Mountford | 32—10 |
| 1,282,446 | 10/1918 | McMahon et al. | 32—10 |
| 2,337,036 | 12/1943 | Erdle | 18—47 |
| 3,255,992 | 6/1966 | Kersten | 249—205 |

LOUIS G. MANCENE, *Primary Examiner.*

R. PESHOCK, *Assistant Examiner.*